Sept. 27, 1949.  F. J. WALTERS  2,482,818

STRIP CHART HOLDER

Filed Jan. 16, 1946

Inventor
Frank J. Walters

By
Attorney

Patented Sept. 27, 1949

2,482,818

UNITED STATES PATENT OFFICE 2,482,818

STRIP CHART HOLDER

Frank J. Walters, United States Navy

Application January 16, 1946, Serial No. 641,553

5 Claims. (Cl. 40—86)

(Granted under the act of March 3, 1883, as amended April 30, 1928; 370 O. G. 757)

This invention relates to improvements in chart holders and more particularly to an improved strip chart holder for use in small aircraft.

A pilot must have positive control of his aircraft at all times during flight. This requires the use of at least one hand and both feet and requires also excellent vision of the surrounding area or of the instrument panel. Charts are difficult to use in small airplanes. This is due to flight duties required of the pilot while using the chart, the large size of the chart, the lack of a suitable holder, and to the lack of position markers and mileage indicators. Under present conditions a pilot's attention must be directed to locating and unfolding the chart, requiring both hands and use of his eyes for lengthy periods locating the desired chart data. This is obviously a poor system and is an annoyance and dangerous, especially while flying on instruments. Charts may not be unfolded to any large extent due to their restriction of the pilot's vision. This means a chart must be pre-folded before the flight and continually re-folded during flight to locate the section required. Additional difficulty encountered during folding is the effect of slipstreams and cockpit drafts on the chart. This sometimes leads to a loss of the chart or complete unfolding in the cockpit obstructing all vision.

No suitable holder is provided in most small planes. If several charts are carried the pilot must search through the map case until he locates the proper chart. This case is usually inaccessibile and requires the release of shoulder straps and bending down into the cockpit. Mileage and position is guess work under the present system. Dividers and scale markers are seldom if ever used as they require two hands. Mileage scales are located at the edges of charts and are usually folded under. This means the small plane pilot never knows his exact position unless a landmark is sighted.

Many devices have been proposed for use with both automobiles and airplanes in attempts to do away with the problems discussed above. Prior inventors have developed devices to be attached to structural parts and even to the pilot's body. Such devices have included pads for working navigational problems, flat charts, and other navigational data. The prior art has also contemplated the use of strip maps mounted on rollers as a navigational aid. Before my invention, none of the devices of the class described either alone or in combination, has provided so practical a solution, as to come into popular use.

Due to crowded instrument panels (especially in military airplanes) and small cockpits the attachment of a chart holder to the body of the pilot is an obviously advantageous expedient. However, previous body attached chart holders have been cumbersome and uncomfortable and have not been supported in such a manner as to preclude shifting and turning of the holder face.

It is an object of this invention to provide an improved chart holder suitable for use by pilots of small airplanes.

It is a further object of this invention to provide a strip chart holder of simple and practical design which may be easily operated by one hand and which makes navigational data easily available to the pilot without it becoming necessary to neglect his normal flight duties.

It is a still further object of this invention to provide a chart holder adapted for attachment to the thigh of an operator and so constructed as to afford multiple point contact with the wearer, thus precluding turning and assuring comfort.

Other objects and advantages of the invention will appear from the following description and accompanying drawing, wherein like reference characters refer to like parts throughout.

Figure 1:
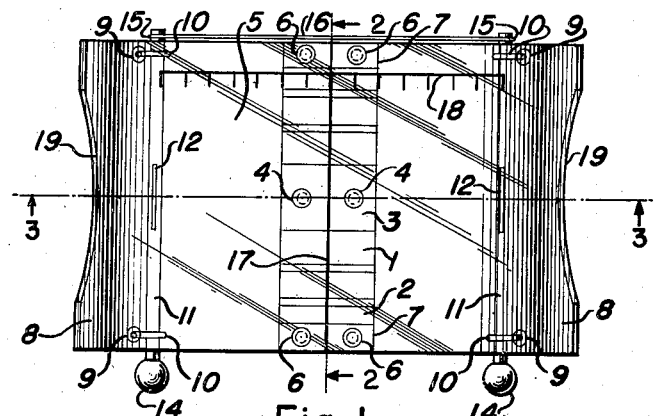
Figure 1 is a top plan view of a strip chart holder embodying my invention, but with a strip chart not inserted.
Figures 2, 3:
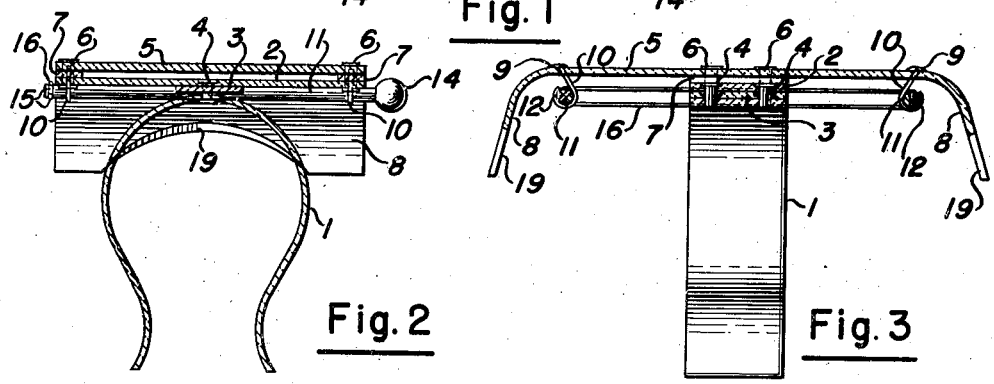
Figure 2 is a transverse section of the device shown in Figure 1, and taken along line 2—2 of Figure 1.
Figure 3 is a transverse section of the device shown in Figure 1 and taken along the reference line 3—3 of that figure.

Referring now to the drawing, which illustrates an embodiment of my invention, my strip chart holder comprises a U-shaped elastic body or leg clamp 1, which is particularly adapted to be clamped to the thigh of an operator. A flat rectangular supporting strip 2, is permanently secured in spaced relation to the closed end of the leg clamp, 1, as by rivets, 4. A spacing block 3, of suitable thickness is interposed in the riveted joint between the leg clamp, 1, and the supporting strip 2, in order to provide a better base for the strip chart roller mechanism and to insure that the operator's clothes or body will not restrict movement of said mechanism. A transparent shield 5 is secured across the supporting strip 2 and in spaced relation from said strip, as by the rivets 6, the spacing blocks 7 being interposed between the supporting strip 2 and the transparent shield 5. The last named spacing blocks 7 and riveted joint are positioned on the extreme outboard ends of the supporting strip 2 so that a strip chart may be movably positioned between the transparent shield 5 and the supporting strip 2. The shield member 5 is curved at each end forming a broad substantially U-shaped, band and thus providing supporting arms 8 and a rectangular surface area, as shown. Close to each corner of the rectangular top surface of the shield 5 a roller supporting loop is attached. Each of the four supporting loops comprises a head member 9 to which is attached a short rod 10 of a suitable thickness. The rod 10 passes through the shield 5 and the head member 9 is welded or otherwise secured to said shield and rounded to conform to its curvature, as may be seen in the drawing. Rods 10 are then bent into loops, thus forming bearings for rollers 11. Rollers 11 are supported in the supporting loops as shown. The rollers 11 are provided with slots 12 which are adapted to receive the narrowed ends of a strip chart 13 as shown in Figure 3. Each of the rollers 11 is also provided with a manipulating knob 14 at one end and with a groove 15, close to the other end. The groove 15 serves as a seat for a rubber band 16 which keeps the roller mechanism aligned and causes simultaneous movement of both rollers when either is turned. Etched upon the face of the shield 5 is a position marker line 17 and a mileage scale 18, as shown.

The supporting arms 8 have cut-out portions 19 of such a shape as to conform to the thigh of the operator and to cooperate with the leg clamp 1 in providing a wide area of support for the device.

Figure 4:
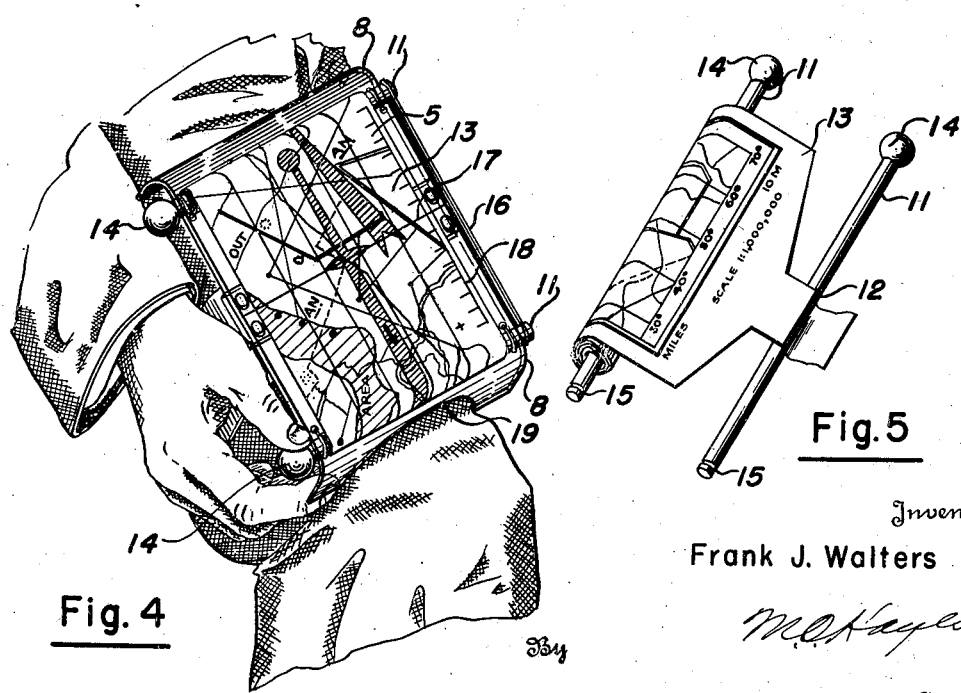
Figure 4 is a perspective view of the embodiment of my invention shown in Figure 1, as it appears in actual use, upon the thigh of an operator and with a strip chart inserted.
Figure 5:
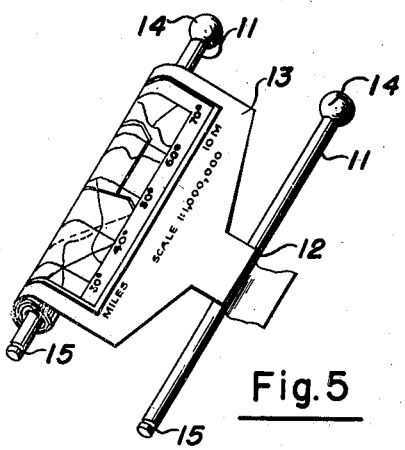
Figure 5 is a perspective view illustrating a preferred method of attaching a strip chart to rollers such as those used in my invention.

In operation, a strip chart such as that best shown in Figures 4 and 5 is prepared to cover the approximate path of a projected flight. The chart 13 is rolled upon one of the rollers 11 and the free end inserted between the shield 5 and the supporting strip 2. The free end of the strip chart is then inserted into the slot 12 of the second roller. The device described above is clamped upon the thigh of the pilot where it may be easily seen and manipulated, as shown in Figure 4. During the flight the pilot, by manipulation of either of the knobs 14 (which can be done with one hand) can keep his present position on the position marker line 17. The mileage scale 18 makes data concerning landmarks, distance covered, etc., easily available.

One of the greatest advantages achieved by my invention is in the cooperation of the arcuate cut-out portions 19 of the face shield with the leg clamp 1 to provide multiple point support. This results in a comfortably worn strip chart holder which will not easily change its position when in use and thereby overcomes the problems which resulted in limiting the use of such devices in the past.

The embodiment shown is made entirely of transparent plastic material. The face shield member must, of course, be transparent, but all other parts of any strip chart holder embodying the principle of my invention, may obviously be made of any suitable opaque material.

It is to be understood that the form of this invention, herewith shown and described, is to be taken as a preferred example, of the same and that various changes in the shape, size and arrangement of parts may be resorted to, without departing from the spirit of this invention, or the scope of the subjoined claims.

The invention described herein may be manufactured and used by or for the Government of the United States of America for governmental purposes without the payment of any royalties thereon or therefor.

What I claim is:

1. A chart holder comprising a resilient U-shaped clamp member for application to an operator's limb a transparent shield member suitably fixed to said clamp member, supporting means at each end of said transparent shield member to hold said shield member spaced from said limb, and means for adjustably securing a chart under said transparent shield member, said supporting means having concave ends to provide extended contacts with the limb of said operator.

2. A chart holder comprising a resilient U-shaped clamp member for application to an operator's limb, a transparent shield member suitably fixed to said clamp member, said transparent shield member having curled ends which form integral supporting legs to hold said shield member spaced from said limb, and means for adjustably securing a chart under said transparent shield member, said supporting legs being adapted to cooperate with said clamp member to provide multiple point support for said transparent shield member upon the limb of said operator.

3. A chart holder comprising a resilient U-shaped clamp member for application to an operator's limb, a transparent shield member suitably fixed to said clamp member, said transparent shield member having curled ends which form integral supporting legs to hold said shield member spaced from said limb, and means for adjustably securing a chart under said transparent shield member, said supporting legs having arcuate cut-out portions at their extremities to provide extension contacts with the limb of said operator.

4. A holder for strip charts comprising a resilient U-shaped clamp member for application to an operator's limb, a transparent shield member suitably fixed to said clamp member, supporting means at each end of said transparent shield member to hold said shield member spaced from said limb, said supporting means being adapted to cooperate with said clamp member to provide multiple point support for said transparent shield member upon the limb of said operator, and rollers suitably supported beneath said transparent shield, said rollers being adapted to support and manipulate a strip chart.

5. A holder for strip charts comprising a resilient U-shaped clamp member, a transparent shield member suitably fixed to said clamp member, said transparent shield member comprising a flat face surface and downwardly dependent end portions, bearing loops dependent from said face surface, roller members rotatably mounted in said bearing loops and adapted to support and manipulate a strip chart, said downwardly dependent end portions being adapted to serve as a supporting means and cooperating with said clamp member to provide multiple point support for said transparent shield member upon the limb of an operator.

FRANK J. WALTERS.

REFERENCES CITED

The following references are of record in the file of this patent:

UNITED STATES PATENTS

| Number | Name | Date |
|---|---|---|
| 625,844 | Kelso et al. | May 10, 1889 |
| 1,312,445 | Johnson | Aug. 4, 1919 |
| 1,430,207 | Woodhouse | Sept. 26, 1922 |
| 1,714,639 | Schaeffer | May 28, 1929 |

FOREIGN PATENTS

| Number | Country | Date |
|---|---|---|
| 12,377 | Great Britain | Nov. 30, 1905 |